United States Patent [19]

Schmidtpott et al.

[11] 4,450,432

[45] May 22, 1984

[54] BINARY MOS PARALLEL COMPARATORS

[75] Inventors: Friedrich Schmidtpott, Gundelfingen; Reiner Backes, Freiburg, both of Fed. Rep. of Germany

[73] Assignee: ITT Industries, Inc., New York, N.Y.

[21] Appl. No.: 296,399

[22] Filed: Aug. 26, 1981

[30] Foreign Application Priority Data

Sep. 25, 1980 [DE] Fed. Rep. of Germany ....... 3036065

[51] Int. Cl.$^3$ .......................... G06F 7/02; G06F 7/04
[52] U.S. Cl. .................................................. 340/146.2
[58] Field of Search ...................................... 340/146.2

[56] References Cited

U.S. PATENT DOCUMENTS

| 3,938,087 | 2/1976 | Louie | 340/146.2 |
| 4,155,071 | 5/1979 | Shamburger | 340/146.2 |
| 4,163,211 | 7/1979 | Miura | 340/146.2 |
| 4,225,849 | 9/1980 | Lai | 340/146.2 |
| 4,323,982 | 4/1982 | Eichrodt et al. | 340/146.2 X |

Primary Examiner—David H. Malzahn
Attorney, Agent, or Firm—James B. Raden; Donald J. Lenkszus

[57] ABSTRACT

The monolithic integrated binary MOS parallel comparator uses enhancement-mode insulated-gate field effect transistors of the same conductivity type and comprises n successively weighted stages each including a NOR block having at least two inputs each receiving a correspondingly weighted digit of a different one of a first and a second n-digit binary word and an additional logic circuit also receiving the correspondingly weighted digit of the first and second words, and an output logic circuit coupled to each of the n stages to provide an output signal for the comparator.

17 Claims, 4 Drawing Figures

BINARY MOS PARALLEL COMPARATORS

BACKGROUND OF THE INVENTION

The present invention relates to parallel comparators and more particularly to binary MOS parallel comparators.

In a book by A. Shah et al, "Integrierte Schaltungen in digitalen Systemen," Vol. 2, Basel, 1977, pages 129 to 143, various types of parallel comparators are described. Two of these types are the ripple-carry parallel comparator, explained on page 136 of that book, and the carry-lookahead parallel comparator, described on pages 140 and 141. The information given in this book is based on commercially available bipolar integrated circuits, and the parallel comparators are described with the aid of block diagrams in which the basic logic gates are used, i.e., AND, OR, NAND, NOR, equivalence (EXCLUSIVE-NOR) and EXCLUSIVE-OR gates, and inverter stages.

Direct application of the fundamental principles of conventional parallel comparators, explained with reference to the aforementioned bipolar integrated circuits, to integrated circuits using insulated-gate field-effect transistors, i.e., to so-called MOS circuits, is not readily possible because MOS technology and bipolar technology differ widely in some respects.

SUMMARY OF THE INVENTION

Accordingly, an object of the present invention is to provide parallel comparators of the above-mentioned type which can be implemented using MOS technology.

In particular, a construction for the individual stages to be connected in parallel is provided which permits implementation even for long word lengths (15 to 30 bits) at justifiable expense and ensures a high computing speed for such long word lengths. Thus, the amount of circuitry required for each stage is kept to a minimum, so that, thanks to the small cell area of a parallel-comparator stage, optimum use can be made of the area available on the semiconductor body of the integrated circuit.

A feature of the present invention is the provision of a monolithic integrated binary MOS parallel comparator using enhancement-mode insulated-gate field-effect transistors of the same conductivity type to compare a first n-digit binary word with a second n-digit binary word comprising: n successively weighted stages each including a NOR block having at least two inputs each receiving a correspondingly weighted digit of a different one of the first and second words, and an additional logic circuit receiving the correspondingly weighted digit of the first and second words; and output logic means coupled to each of the n stages to provide an output signal for the comparator.

BRIEF DESCRIPTION OF THE DRAWING

Above-mentioned and other features and objects of this invention will become more apparent by reference to the following description taken in conjunction with the accompanying drawing, in which.

DESCRIPTION OF THE PREFERRED EMBODIMENTS

Figure 1:
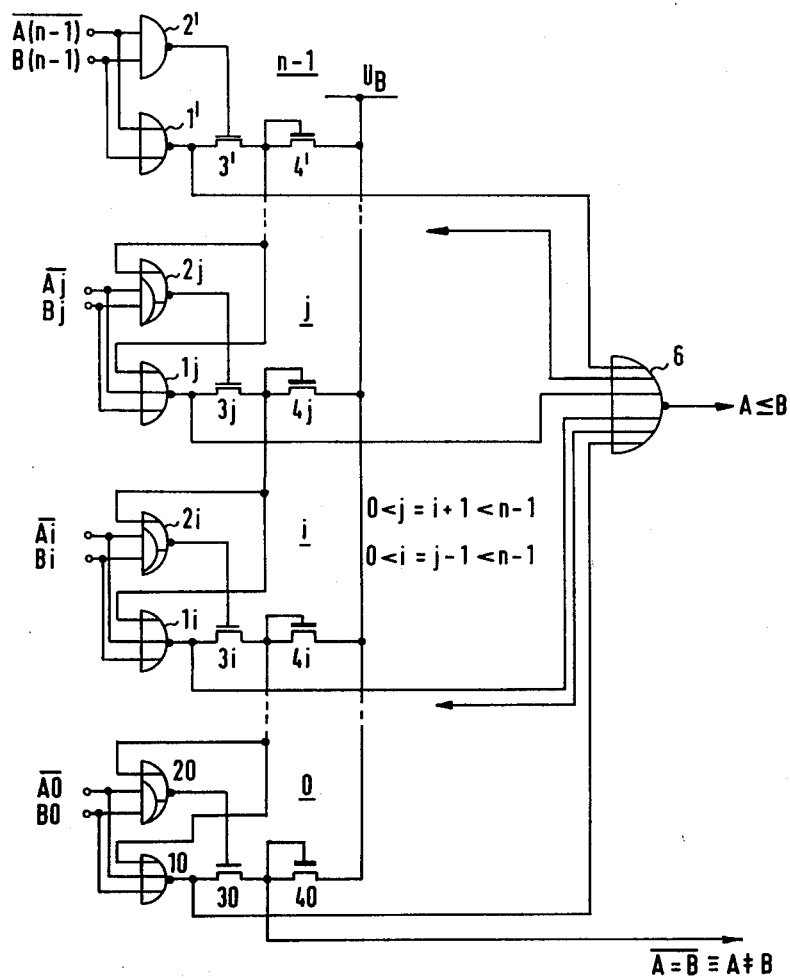
FIG. 1 is a schematic diagram of a first embodiment of a parallel comparator in accordance with the principles of the present invention.

Of the n possible stages of the MOS parallel comparator, the schematic diagram of FIG. 1 shows the lowest-order stage O, having the weighting value $2^O$, the successive stages i and j, where j is i+1, and the highest-order stage n−1, having the weighting value $2^{n-1}$. The construction of the highest-order stage n−1 differs slightly from that of the other stages; this will be explained later.

Each of the stages, O, i, j include a first NOR block 10, 1i, 1j, a complex logic-circuit block 20, 2i, 2j, a transfer transistor 30, 3i, 3j, and a load transistor 40, 4i, 4j. In stage i—the same applies analogously to stages O and j—the input signals $\overline{Ai}$, $Bi$ are applied to the first and second inputs of the NOR block 1i, and the third input of the NOR block 1i is connected to the junction point of the transfer transistor 3j and the load transistor 4j of the next higher-order stage j. The controlled current paths of these two transistors are connected in series.

The complex logic-circuit block 2i includes an AND gate whose two inputs are fed with the input signals $\overline{Ai}$, $Bi$ as is known from the above-mentioned prior art, page 139, and a NOR gate which forms the NOR of the output signals of the AND gate with the signal at the junction point of the transfer transistor 3j and the load transistor 4j of the next higher-order stage j. The output of the complex logic-circuit block 2i is connected to the gate of the transfer transistor 3i. The load transistors are connected to the supply voltage $U_B$.

In the highest-order stage n−1, the first NOR block 1' has no third input. Its two inputs are fed with the signals A(n−1) and B(n−1), respectively. The complex logic-circuit block has been replaced in stage n−1 by a NAND block 2', whose two inputs are fed with the same signals as the NOR block 1'. The output of the NAND block 2' is coupled to the gate of the transfer transistor 3', which has one end of its current path connected to the output of the NOR block 1', while the other end is connected to the supply voltage $U_B$ via the load transistor 4'.

The outputs of all first NOR blocks 10, 1i, 1j, 1' are each coupled to one input of a common NOR block 6, whose output provides the signal for $A \leq B$, while the signal for $A = B$ can be taken off the junction point of the transfer transistor 30 and the load transistor 40 of the lowest-order stage O. In the embodiment of FIG. 1, the load transistors 40, 4i, 4j, 4' are shown as resistance-connected depletion-mode transistors. This is not compulsory; it is also possible to use enhancement-mode transistors. The construction of a stage with only two logic-circuit blocks, a transfer transistor and a load transistor gives a small-area cell as was the object of the invention, with each of the logic-circuit blocks having a load connected thereto, however. In addition, the common NOR block must be provided, which adds only little to the overall circuit complexity of the MOS parallel comparator according to the invention.

The embodiment of FIG. 1 uses positive logic, i.e., the more positive level, H, represents the logic 1 state, and the more negative level, L, represents the logic 0 state. For the following explanation it is assumed that the lines interconnecting the stages n−1 and j as well as i and O, which are indicated by broken lines, are connected through, i.e., that a four-stage parallel comparator is formed. First, the operation with respect to the two binary-word pairs A=1011, B=1100 and A=0010, B=1100 will be explained.

In the highest-order stage n−1, the inverted A digit signal (=0) and the B digit signal (=1) lead to an H level at the output of the NAND block 2', and to an L level at the output of the NOR block 1'. Thus, the transfer transistor 3' is turned on, and the L level also appears at the junction point of the transfer transistor 3' and the load transistor 4' and, consequently, at one input of the NOR gate of the complex logic-circuit block 2j and at one input of the NOR block 1j of the next lower-order stage j.

In stage j, the inverted A digit signal 1 and the B digit signal 1 result in an H level at the output of the AND gate and, hence, in an L level at the output of the complex logic-circuit block 2j. On the other hand, these digit signals, together with the L level from the aforementioned junction point, also lead to an L level at the output of the NOR block 1j. Since, however, the transfer transistor 3j is not turned on by the L level at the output of the complex logic-circuit block 2j but remains off, the junction point of the transfer transistor 3j and the load transistor 4j is at an H level.

The H level at this junction point leads to an L level at the output of the complex logic-circuit block 2i of the next lower-order stage i, irrespective of the digit signals applied to the inputs of the associated AND gate. The same applies to the output of the NOR block 1i, which is also at L level as a result of the H level at the junction point of the preceding stage j, irrespective of the digit signals applied to two of its inputs. Thus, however, the junction point of transfer transistor 3i and load transistor 4i is at H level, like in stage j. In the present case, stage O clearly operates in the same manner as stage i, i.e., the output of the complex logic-circuit block 20 is at L level, while the junction point of transfer transistor 30 and load transistor 40 is at H. level. This H level signifies A≠B. It is also apparent that all outputs of the NOR blocks 1', 1j, 1i, 10 are at L level, so that the output of the common NOR block 6 is at H level, signifying A<B, quod erat demonstrandum.

For the above-mentioned second input-signal combination A=0010, B=0011, the circuit works as follows. The output of the NAND block 2' is at H level, and the output of the NOR block 1' is at L level. Hence, the transfer transistor 3' is conducting, so that the junction point of this transistor and the load transistor 4' is at L level, too. This L level, together with the L level caused by the AND gate of the complex logic-circuit block 2j, leads to an H level at the output of the complex logic-circuit block 2j; at the output of the NOR block 1j the L level and the input signals lead to an L level. As a result, the transfer transistor 3j is turned on, and the junction point of the transfer transistor 3j and load transistor 4j is at L level.

This L level at the junction point, together with the input-signal combination at the inputs of the AND gate, causes an H level to appear at the output of the complex logic-circuit block 2i of the next lower-order stage i, and results in an L level at the output of the NOR block 1i. The junction point of transfer transistor 3i and load transistor 4i is, therefore, at L level again. This leads to an L level both at the output of the complex logic-circuit block 20 and at the output of the NOR block 10, so that the junction point of transfer transistor 30 and load transistor 40 is at H level, which again signals that A≠B. Since, in addition, the outputs of all NOR blocks 1', 1j, 1i, 10 are at L level, the output of the common NOR block 6 is at H level again, which represents the true statement for the condition A<B, quod erat demonstrandum.

As is apparent from the above explanation of two examples, in the direction of decreasing weighting values, an H level at the junction point of transfer transistor and load transistor appears for the first time in that stage where both digit signals are 1. This H level, to be regarded as a "carry," then causes an H level in the subsequent stages whenever the corresponding transfer transistor in all those stages is off. Only if a 0-1 combination occurs with all digit signals being equal will the junction point of transfer transistor 30 and load transistor 40 of the lowest-order stage O be at L level, which signals the equality assumed.

The just explained states at the various points of the circuit are summed up in TABLE I. The last column gives the corresponding states for a number couple with A>B.

TABLE I

|  | A = 1011<br>Ā = 0100<br>B = 1100 | A = 0010<br>Ā = 1101<br>B = 0011 | A = 1010<br>Ā = 0101<br>B = 1010 | A = 1111<br>Ā = 0000<br>B = 1000 |
|---|---|---|---|---|
| Ag 2' | H | H | H | H |
| Ag 1' | L | L | L | L |
| 3' | conducting | conducting | conducting | conducting |
| VB$_{n-1}$ | L | L | L | L |
| Ag 2j | L | H | H | H |
| Ag 1j | L | L | L | H |
| 3j | blocked | conducting | conducting | conducting |
| VBj | H | L | L | H |
| Ag 2i | L | H | H | L |
| Ag 1i | L | L | L | L |
| 3i | blocked | conducting | conducting | blocked |
| VBi | H | L | L | H |
| Ag 20 | L | L | H | L |
| Ag 10 | L | L | L | L |
| 30 | blocked | blocked | conducting | blocked |
| VBO | H | H | L | H |

Ag = Output of . . .
VB = Junction point of transfer trasistor and load transistor in stage . . .

Figure 2:
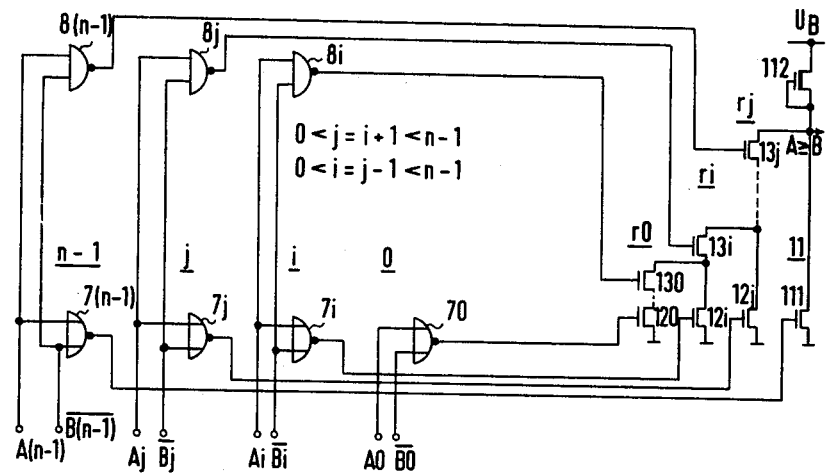
FIG. 2 is a schematic diagram of a second embodiment of a parallel comparator in accordance with the principles of the present invention.

FIG. 2 shows the schematic diagram of a second embodiment of the present invention. There are again four stages, namely, the stage O, having the lowest weighting value $2^0$, two successive stages i, j, and the highest-order stage n−1, having the weighting value $2^{n-1}$. Each stage contains one NOR block; thus, the NOR blocks 70, 7i, 7j, 7(n−1) are shown in FIG. 2. The two inputs of each of these NOR blocks are fed with the digit signals AO and $\overline{BO}$, Ai and $\overline{Bi}$, Aj and $\overline{Bj}$, and A(n−1) and $\overline{B(n-1)}$, respectively. Also provided is an output inverter 11 formed by a switching transistor 111 and a load transistor 112. The latter is shown in FIG. 2 as a depletion-mode transistor, which offers certain advantages, but an enhancement-mode transistor is also possible. The switching transistor 111 has one end grounded, and the load transistor 112 is connected to the supply voltage $U_B$. The input of the output inverter 11, i.e., the gate of the switching transistor 111, is connected to the output of the NOR block 7(n−1) of the highest-order stage n−1. Assuming positive logic again, the output-inverter output i.e., the junction point of the switching transistor 111 and load transistor 112, provides the signal for A≧B.

Each of the stages 1 to n−1, i.e., the stages i, j, n−1 in FIG. 2, contains a NAND block 8i, 8j, 8(n−1), whose two inputs are also supplied with the aforementioned digit signals, i.e, these two inputs are connected to the two inputs of the respective NOR block 7i, 7j, 7(n−1).

The stages O to n−2, i.e., in the embodiment of FIG. 2 the stages O, i, j, each include a series arrangement rO, ri, rj of the channels of two transistors 120, 130; 12i, 13i, 12j, 13j, one end of which series arrangement is connected to ground. The gate of the respective grounded transistor, the so-called "low-end transistor" 120, 12i, 12j, is connected to the output of the respective NOR block 70, 7i, 7j of the respective stage O, i, j, and the gate of the respective ungrounded transistors, the so-called "high-end transistor" 130, 13i, 13j, is connected to the output of the respective NAND block 8i, 8j, 8(n−1) of the next higher-order stage i, j, n−1.

The ungrounded end of the series arrangement rO, ri, rj is connected to the junction point of the high-end and low-end transistors of the next higher-order series arrangement ri, rj, the output inverter 11 having to be regarded as the series arrangement forming part of the highest-order stage. The ungrounded end of the series arrangement rj is thus connected to the output of the output inverter 11.

The embodiment of FIG. 2 can be used in all cases where only a statement about A being greater than or equal to B is needed, which statement is equivalent to the statement B<A. In positive logic, therefore, an H level at the output-inverter output means A≧B, and an L level means A<B.

Figure 3:
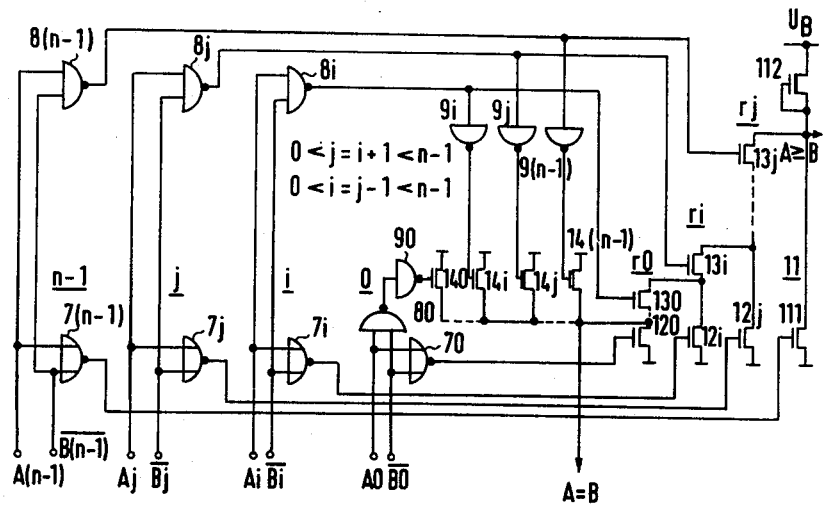
FIG. 3 is a schematic diagram of a first variation of the arrangement of FIG. 2.

FIG. 3 shows a first variation of the arrangement of FIG. 2, for applications in which an unambiguous statement about A>B is required. With the subcircuits added to the circuit of FIG. 2, a statement about A=B is made possible so that the statement A>B follows from the H level for A≧B and the L level for A≠B. In the embodiment of FIG. 3, each stage O, i, j, n−1 contains an inverter 90, 9i, 9j, 9(n−1) and a transistor 140, 14i, 14, 14(n−1) having its source connected to ground. The respective inverter input is connected to the output of the NAND block of the associated stage. The lowest-order stage O, too, contains a NAND block 80, which corresponds to the NAND blocks in the other stages and has its output coupled to the input of the inverter 90.

The drains of the transistors 140, 14i, 14j, 14(n−1) are connected in common to the junction point of the high-end and low-end transistors 120, 130 of the lowest-order stage O, and the aforementioned signal for A=B can be taken off this junction point.

Figure 4:
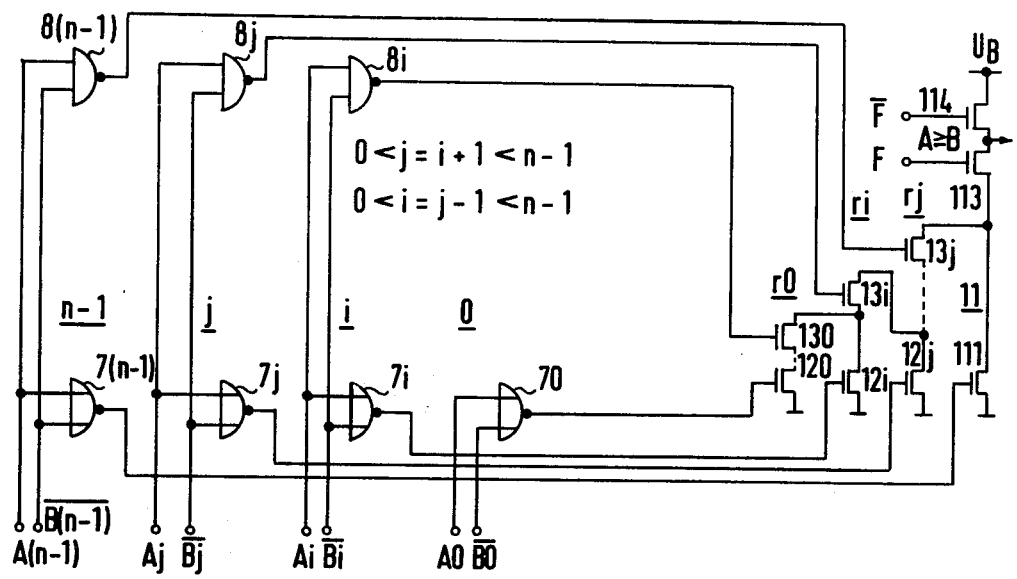
FIG. 4 is a schematic diagram of a second variation of the arrangement of FIG. 2.

FIG. 4 shows a second variation of the arrangement of FIG. 2, which can also be used in the variation of FIG. 3. The load transistor 112 of FIGS. 2 and 3 has been replaced by two clocked transistors 113, 114 in series, whose gates are fed with mutually inverse clock signals, F, F̄, while the output is connected to the junction point of these two series-connected transistors 113, 114. In this circuit variation, the output signal can be obtained only during the clock phase F.

For the operation of the arrangements of FIGS. 2 and 3, reference is made to TABLE II, in which positive logic is assumed as in the arrangement in FIG. 1.

TABLE II

|  | A = 1011<br>B = 1100<br>B̄ = 0011 | A = 0010<br>B = 0011<br>B̄ = 1100 | A = 1010<br>B = 1010<br>B̄ = 0101 | A = 1111<br>B = 1000<br>B̄ = 0111 |
|---|---|---|---|---|
| Ag 8(n − 1) | H | H | H | H |
| Ag 7(n − 1) | L | L | L | L |
| 13j | conducting | conducting | conducting | conducting |
| Ag 8j | H | H | H | L |
| Ag 7j | H | L | L | L |
| 12j | conducting | blocked | blocked | blocked |
| 13i | conducting | conducting | conducting | blocked |
| VB rj | L | L | H | H |
| Ag 8i | L | H | H | L |
| Ag 7i | L | L | L | L |
| 130 | blocked | conducting | conducting | blocked |
| 12i | blocked | blocked | blocked | blocked |
| VB ri | L | L | H | undefined |
| Ag 70 | L | H | L | L |
| 120 | blocked | conducting | blocked | blocked |
| VB rO | L* | L | H | L* |
| VB 11 | L | L | H | H |
| (A ≧ B) |  |  |  |  |
| Ag 80 | L | H | H | L |
| 140 | conducting | blocked | blocked | conducting |
| 14i | conducting | blocked | blocked | conducting |
| 14j | blocked | blocked | blocked | conducting |
| 14(n − 1) | blocked | blocked | blocked | blocked |
| VB 120 | L | L | H | L |
| (A = B) |  |  |  |  |

Ag ... = Output of ...
VB ... = Junction point of the series-connected transistors in the series arrangement
*= in FIG. 3; otherwise undefined In the figures, only those logic elements have a load where a point or dot is placed at the output of the logic symbol to denote that inversion occurs. For this reason, a distinction was made between a logic-circuit block which is such a circuit with a load, and a logic gate which is only part of such a logic-circuit block.

The common NOR block 6 of FIG. 1 can be dispensed with if the comparator is to compare for equality only.

While we have described above the principles of our invention in connection with specific apparatus, it is to be clearly understood that this description is made only by way of example and not as a limitation to the scope of our invention as set forth in the objects thereof and in the accompanying claims.

We claim:

1. A monolithic integrated binary MOS parallel comparator using insulated-gate field-effect transistors of the same conductivity type to compare a first n-digit binary word with a second n-digit binary word comprising:

n successively weighted stages each including a NOR block having at least two inputs each receiving a correspondingly weighted digit of a different one of said first and second words, an additional logic circuit receiving said correspondingly weighted digit of said first and second words, and a transfer transistor and a load transistor connected in series between the output of said NOR block and a supply voltage source, the output of said additional logic circuit being coupled to the gate of said transfer transistor; and circuit means coupling a first output terminal to at least one of said n stages to provide an output signal for said comparator.

2. A comparator according to claim 1, wherein said NOR block of each of said n stages except the highest order stage has three inputs, first and second inputs of said three inputs having said correspondingly weighted digits of said first and second words coupled thereto;

said additional logic circuit of each of said n stages except the highest order stage comprising a complex logic-circuit block including an AND gate having said correspondingly weighted digits of said first and second words coupled thereto and a NOR gate having its output coupled to said gate of said transfer transistor, a first input connected to an output of said AND gate and a second input connected to a junction point of said transfer transistor and said load transistor of the next higher order stage which junction point is connected to a third input of said three inputs of said NOR block, said additional logic circuit of the highest order stage comprising a NAND block having the highest weighted digits of said first and second words connected thereto and its output connected to the gate of said transfer transistor.

3. A comparator in accordance with claim 2, wherein said junction point of the lowest order of said stages provides a signal indicating whether said first and second words are equal or unequal.

4. A comparator in accordance with claim 2, wherein each said transfer transistor is an enhancement-mode transistor.

5. A comparator according to claim 4, wherein each said load transistor is a resistance-connected depletion-mode transistor.

6. A comparator in accordance with claim 4, wherein each said load transistor is an enhancement-mode transistor.

7. A comparator in accordance with claim 2, wherein said circuit means comprises a common NOR block having n inputs each connected to an output of each said NOR block of each of said n stages, and having an output connected to said first output terminal.

8. A comparator in accordance with claim 7, wherein said junction point of the lowest order of said stages provides a signal indicating whether said first and second words are equal or unequal.

9. A comparator in accordance with claim 7, wherein each said transfer transistor is an enhancement-mode transistor.

10. A comparator in accordance with claim 9, wherein each said load transistor is an enhancement-mode transistor.

11. A comparator according to claim 9, wherein each said load transistor is a resistance-connected depletion-mode transistor.

12. A comparator in accordance with claim 1, wherein each said NOR block, each said additional logic block and said transfer transistor comprises enhancement mode insulated gate field effect transistors.

13. A comparator in accordance with claim 12, wherein said load transistor comprises a resistance-connected depletion mode transistor.

14. A monolithic integrated binary MOS parallel comparator using insulated-gate field-effect transistors of the same conductivity type to compare a first n-digit binary word with a second n-digit binary word comprising:

n successively weighted stages each including a NOR block having at least two inputs each receiving a correspondingly weighted digit of a different one of said first and second words, and an additional logic circuit including a NAND block to receive said correspondingly weighted digit of said first and second words;

each of said n stages except the highest order stage including a series arrangement of the channels of two transistors, one end of said series arrangement being connected to ground, the gate of the grounded one of said two transistors being connected to the output of the associated one of said NOR block, the gate of the ungrounded one of said two transistors being connected to the output of said NAND block of its next higher order stage and the other end of said series arrangement being connected to a junction point of said two transistors of the next higher order series arrangement; and an output inverter having a switching transistor and a load connected in series, the gate of said switching transistor being connected to said NOR block of the highest order stage, the junction of said switching transistor and said load providing an output signal for said comparator and being connected to said other end of said series arrangement of the next lower order stage.

15. A comparator according to claim 14, wherein each of said n stages further includes an inverter coupled to the output of an associated one of said NAND blocks and a transistor having its gate coupled to the output of said inverter, the source of said transistor connected to ground and its drain connected to the junction of said two transistors of the lowest order stage, a signal indicating equality of said first and second words being taken from this latter junction.

16. A comparator according to claims 14 or 15 wherein
said load of said output inverter includes a resistance-connected depletion-mode transistor.

17. A comparator according to claims 14 or 15, wherein
said load of said output inverter includes two series connected transistors each controlled by a different one of two opposite phase clock signals, said output signal being provided at the junction of said two series connected load transistors.

* * * * *